J. F. WHITE.
CUSHION TIRE FOR VEHICLES.
APPLICATION FILED FEB. 2, 1916.

1,213,719.  Patented Jan. 23, 1917.

WITNESSES:
D. E. Jenkins
G. Higgins

INVENTOR.
John F. White
BY Max H. Srolovitz
ATTORNEY

UNITED STATES PATENT OFFICE.

JOHN F. WHITE, OF PITTSBURGH, PENNSYLVANIA.

CUSHION-TIRE FOR VEHICLES.

1,213,719.   Specification of Letters Patent.   Patented Jan. 23, 1917.

Application filed February 2, 1916. Serial No. 75,646.

*To all whom it may concern:*

Be it known that I, JOHN F. WHITE, a citizen of the United States, residing at Pittsburgh, in the county of Allegheny and State of Pennsylvania, have invented certain new and useful Improvements in Cushion-Tires for Vehicles, of which the following is a specification.

This invention relates to cushion tires for vehicles, more particularly motor vehicles, and is an improvement upon the construction of cushion tires as set forth in my application filed July 15th, 1915, Serial No. 40,102, and besides embodying the objects contained in the application referred to, has for its further objects to reduce friction to a minimum during the operation of radially shiftable connected pressure equalizing elements forming a part of the tire construction, and further includes means to permit of lubricating the shiftable elements of the tire.

Further objects of the invention are to provide a cushion tire possessing the cushioning characteristics of the ordinary type of pneumatic tire now in general use, as well as providing a tire which is comparatively simple in its construction and arrangement, strong, durable, and efficient in its use.

With the foregoing and other objects in view the invention consists of the novel construction, combination and arrangement of parts as hereinafter more specifically described and illustrated in the accompanying drawing, wherein is shown an embodiment of the invention, but it is to be understood that changes, variations and modifications can be resorted to which come within the scope of the claims hereunto appended.

Figure 1:
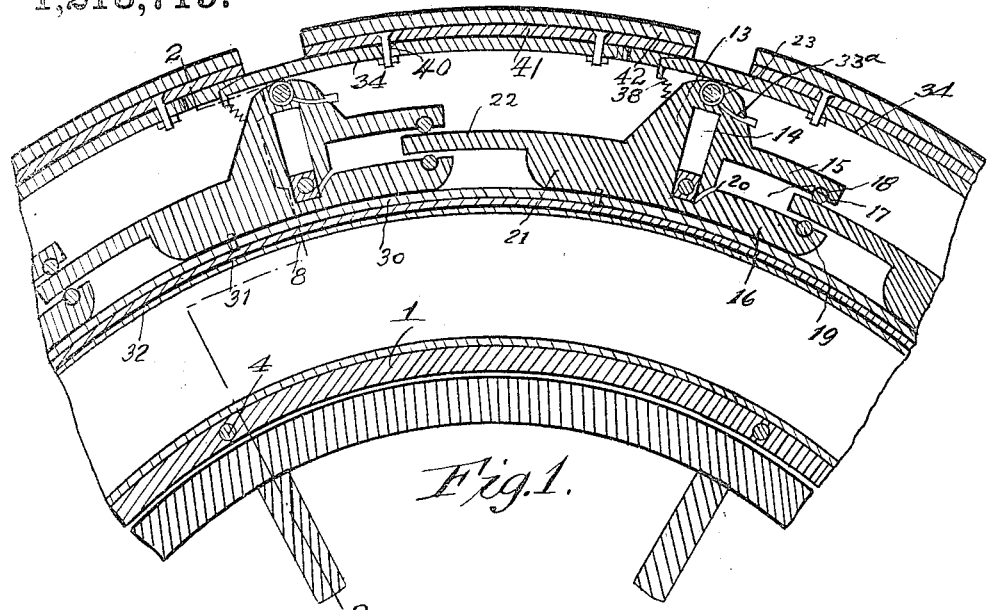
Figures 2, 3:
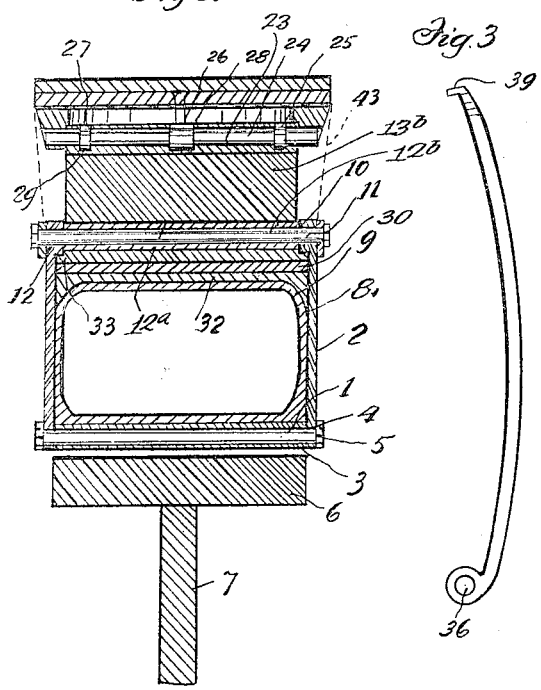
Figure 4:
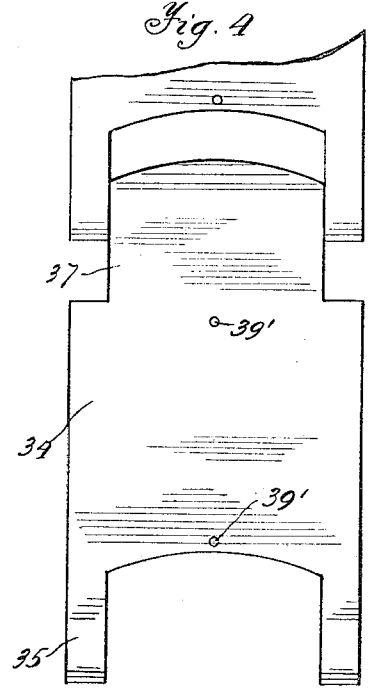

In the drawings wherein like reference characters denote corresponding parts throughout the several views: Figure 1 is an enlarged longitudinal section through the tire and wheel rim. Fig. 2 is a cross sectional view of the tire on line 2—2, Fig. 1. Fig. 3 is an edge view of one of the bridge members. Fig. 4 is a top plan view, broken away, of a pair of bridge members.

A cushion tire in accordance with this invention includes an inner or cushioning section, an intermediate or pressure equalizing section, and an outer or tread section. The inner section consists of an annular member 1 having positioned against each edge thereof an annular plate 2. The annular member 1 is formed with transverse openings 3, through which extend bolts 4, these latter project through the plates 2 and in connection with nuts 5 fixedly secure the plates. 1 is mounted upon the felly 6 and preferably frictionally engaging therewith, but any suitable securing devices may be employed for maintaining the annular member 1 in position. To the felly 6 is attached the spoke 7.

The member 1 in connection with the plates 2 forms an annular channel 8 and positioned within said channel 8 is a cushioning element 9, of a type of the inner tube now employed in pneumatic tires. Suitable means can be used for inflating the element 9.

The inner face of each of the plates 2, near its outer end, has an annular inset 10, which provides a shoulder 11 for a purpose to be presently referred to, and each of said plates 2, near its outer end, is formed with a series of openings 12 which extend through the inset portions 10, and the openings 12 of one plate are arranged in alinement with the openings 12 which are formed in the other plate. The function of the openings 12 will be presently referred to. The intermediate section includes a series of inter-engaging segment-shaped radially shiftable pressure equalizing elements and as each of said elements is of the same construction but one will be described. It will be stated however that the said series of pressure equalizing elements are arranged in the form of an annulus. Each of said elements is constructed of any suitable material, preferably metal, and comprises a tapering body portion 13 formed with a rectangular slot 14 which is radially disposed with respect to the axis of the wheel. The side walls of the slot 14 constitute what may be termed guides for the equalizing element when the latter shifts radially and associating with the slot 14, is an elongated bearing member $12^a$, which is square in cross section and against which rides the side walls of the slot 14. The end walls of the slot 14 limits the movement in either direction when the equalizing element is shifted radially and the said end walls are adapted to abut against the member $12^a$ whereby the movement of the element is arrested. The member $12^a$ also constitutes a spacer and it is retained in position by a cylindrical rod $12^b$ which extends through the member 12ª, and also through a pair of alining openings 12. The members 12ª and rod 12ᵇ maintain the equalizing elements in spaced relation with respect to each other. Projecting from one side of the body portion 13 are a pair of arms 15, 16, spaced from each other to form a pocket 17. The arm 15 is the outer and the arm 16 is the inner. The opposed faces of the arms 15, 16, at their outer ends, have grooves 18, in which are arranged roller bearings 19. Leading from the inner end of the pocket 17 to the bottom of the slot 14 is a port 20 for supplying lubricant to the slot 14 from the groove 18. The body portion 13 is formed with an arm 21 extending in opposite direction with respect to the arms 15, 16, and projecting from the arm 21 is a tongue 22 which extends in the pocket 17 and between the bearing rolls 19 of an adjacent pressure equalizing element.

The body portion 13, at the top thereof, is formed with a transverse opening 23, in which is arranged a cylindrical pivot rod 24, and which has loosely mounted thereon anti-friction rollers 25, 26 and 27. The body portion 13 has openings 28 through which project the said anti-friction rollers and said body portion furthermore has pockets or seats 29 into which extend the anti-friction rollers and the walls of said pockets, as well as the walls of the openings 28 prevent longitudinal movement of the anti-friction rollers with respect to the cylindrical rod 24. The rod 24 is of greater length than the width of the body portion 13 and projecting from each end thereof for a purpose to be presently referred to.

Arranged against the inner faces of the pressure equalizing elements is a flexible annular member 30 and the latter is secured to each of said elements by a rivet or other suitable means as at 31. Secured against the inner face of the flexible member 30 is a flexible member 32 which acts as a protector for the tube 8. The pressure equalizing elements have their inner ends formed with extensions 33 which are adapted to abut against the shoulders 11 to arrest complete separation of the intermediate section with respect to the cushioning section and each of said pressure equalizing elements is formed with a port 33ª whereby lubricant can be supplied to the opening 23. The tread section includes a series of anti-engaging segment-shaped bridge members and each includes a body portion 34, having one end formed with a pair of arms 35. Each terminates in a barrel 36 and the said barrels 36 are pivotally mounted upon the ends of the rods 24. The other end of the body portion has a tongue 37 which projects between the arms 35 of adjacent bridge member and said tongue 37 rides upon the anti-friction rollers 25, 26 and 27. The tongues 37 are maintained upon the anti-friction rollers by springs 38, which are connected to a lug 39 on the tongue and to the body portion 13 of a pressure equalizing element. Each of the bridge members has a pair of openings 39′ through which extend securing devices 40 for connecting segement-shaped plate 41 upon the periphery of a bridge member and secured to the plate 41 is a resilient tread member 42. If desired the sides of the intermediate section can be provided with a flexible covering as indicated in dotted lines at 43.

The bridge members are arranged to bridge between the centers or near the centers of the pressure equalizing elements, that is, the ends of the bridge members pressing on the tops at the centers of the radially shiftable pressure equalizing elements, under such conditions providing a series of bridges, between the center of one and the center of the next element and so on all around the tire and in this way the pressure or compression is equalized as the load is shifted from center to center and at no time is the entire load pressure on the ends of the pressure equalizing elements.

What I claim is:—

1. A tire for vehicles comprising an inner section having a protected element to constitute an air chamber, an intermediate section cushioned by said protected element and including radially shiftable interengaging pressure equalizing elements, and an outer section surrounding said elements and including bridge members each pivotally connected at one end with one of said elements and having its other end free of the pivot of an adjacent bridge member, a free end of one bridge member slidable in the pivoted end of an adjacent bridge member and on the pivot for said latter member.

2. A tire for vehicles comprising an inner section having a protected element to constitute an air chamber, an intermediate section cushioned by said protected element and including radially shiftable interengaging pressure equalizing elements, and an outer section surrounding said elements and including bridge members each pivotally connected at one end with one of said elements and having its other end free of the pivot of an adjacent bridge member, a free end of one bridge member slidable in the pivoted end of an adjacent bridge member and on the pivot for said latter member, and means for connecting the free ends of the bridge members to the pressure equalizing elements for maintaining each bridge member on that element upon which it slides.

3. A tire for vehicles comprising an inner section including a cushioning element, an intermediate section cushioned by said element and having radially shiftable equalizing elements, each of said elements having a lateral pocket at one side and a laterally extending arm at the other side, the arm of one equalizing element extending to the pocket of an adjacent equalizing element, and an outer section surrounding said equalizing elements and including a series of bridge members each having one end pivotally connected with a pressure equalizing element and its other end free of the pivot of an adjacent bridge member, the free end of one member slidable in the pivoted end of an adjacent bridge member and on the pivot of said latter member.

4. A tire for vehicles comprising an inner section including a cushioning element, an intermediate section cushioned by said elements and having radially shiftable pressure equalizing elements, each of said elements having a pocket at one side and at its other side a laterally extending arm having a tongue, the tongue of one equalizing element extending in the pocket of an adjacent equalizing element, an outer section surrounding said equalizing element and including a series of bridge members each having one end pivotally connected with a pressure equalizing element and its other end free of the pivot of an adjacent bridge member, the free end of one bridge member slidable in the pivoted end of an adjacent bridge member, rolls carried by the pivots of said bridge members and upon which slide the free ends of the bridge members, and an anti-friction means carried by each of said pressure equalizing elements within the pocket thereof for the tongue of an adjacent element.

5. A tire for vehicles comprising an inner section including a cushioning element, an intermediate section cushioned by said element and having radially shiftable pressure equalizing elements, each of said elements having a pocket and an arm, the arm of one equalizing element extending in the pocket of an adjacent equalizing element, and an outer section surrounding said equalizing elements and including a series of bridge members pivotally connected with said pressure equalizing elements, each of said bridge members sliding upon a pressure equalizing element adjacent to that element to which said bridge member is pivoted, anti-friction means carried by said pressure equalizing elements for said bridge members, and resilient means for connecting said bridge members with said pressure equalizing elements.

6. A tire for vehicles comprising an inner section including a cushioning element, an intermediate section cushioned by said element and having radially shiftable pressure equalizing elements, each of said elements having a pocket and an arm, the arm of one equalizing element extending in the pocket of an adjacent equalizing element, and an outer section surrounding said equalizing elements and including a series of bridge members pivotally connected with said pressure equalizing elements, each of said bridge members sliding upon a pressure equalizing element adjacent to that element upon which said bridge member is pivoted, and anti-friction means carried by said pressure equalizing elements for said bridge members, and anti-friction means carried by said pressure equalizing elements for said arms.

7. A tire for vehicles comprising an inner section having a protected element to constitute an air chamber, an intermediate section cushioned by said protected element and including radially shiftable inter-engaging pressure equalizing elements provided with slots, said intermediate section further including means extending through said slots for limiting the radially shiftable movement of said elements, and further to arrest circumferential movement of the elements, and an outer section surrounding said elements and including bridge members each having one end pivotally connected with one of said elements and its other end sliding upon an adjacent element, the slidable end of one bridge member moving in the pivoted end of an adjacent bridge member, and resilient means for maintaining the free ends of said bridge members upon those elements which said free ends slide upon.

8. A tire for vehicles comprising an inner section having means to constitute a cushion, an intermediate section cushioned by the inner section and including radially shiftable pressure equalizing elements, and an outer section surrounding said elements, and including bridge members each having one end provided with a pair of arms pivotally connected with an equalizing element and its other end with a tongue extending and sliding between the arms of an adjacent member, said tongues shifting on and free of the pivots for said members.

In testimony whereof I affix my signature in the presence of two witnesses.

JOHN F. WHITE.

Witnesses:
LUELLA H. SIMON,
B. E. JENKINS.

Copies of this patent may be obtained for five cents each, by addressing the "Commissioner of Patents. Washington, D C."